US00RE34631E

United States Patent [19]

Norling

[11] E Patent Number: Re. 34,631

[45] Reissued Date of Patent: Jun. 7, 1994

[54] STRESS COMPENSATED TRANSDUCER

[75] Inventor: Brian L. Norling, Mill Creek, Wash.

[73] Assignee: AlliedSignal Inc., Morris Township, Morris County, N.J.

[21] Appl. No.: 898,963

[22] Filed: Jun. 12, 1992

Related U.S. Patent Documents

Reissue of:

[64] Patent No.: 4,932,258
Issued: Jun. 12, 1990
Appl. No.: 212,785
Filed: Jun. 29, 1988

[51] Int. Cl.[5] ..... G01P 15/13
[52] U.S. Cl. ..... 73/497; 73/517 B
[58] Field of Search ..... 73/517 B, 517 R, 517 AV, 73/497, 514

[56] References Cited

U.S. PATENT DOCUMENTS

| | | | |
|---|---|---|---|
| 3,339,419 | 9/1967 | Wilcox | 73/517 |
| 3,370,187 | 2/1968 | Straube | 310/9.1 |
| 3,673,873 | 7/1972 | Estes et al. | 73/517 |
| 3,702,073 | 11/1972 | Jacobs | 73/517 |
| 3,788,149 | 1/1974 | Wilner | 73/517 R |
| 4,182,187 | 1/1980 | Hanson | 73/497 |
| 4,250,757 | 2/1981 | Hanson | 73/517 B |
| 4,394,405 | 7/1983 | Atherton | 427/58 |
| 4,399,700 | 8/1983 | Hanson | 73/517 B |
| 4,400,979 | 8/1983 | Hanson et al. | 73/517 B |
| 4,441,366 | 4/1984 | Hanson | 73/517 B |
| 4,494,409 | 1/1985 | Kondo et al. | 73/651 |
| 4,498,342 | 2/1985 | Aske | 73/517 B |
| 4,555,944 | 12/1985 | Hanson et al. | 73/517 B |
| 4,926,689 | 5/1990 | Hanson | 73/497 |

*Primary Examiner*—John E. Chapman
*Attorney, Agent, or Firm*—Howard G. Massung

[57] ABSTRACT

A transducer having compensation for a deflection due to an applied stress. The transducer includes a support ring (32) having a proof mass (34) cantilevered on a pair of flexures (38) between the magnets (26,28) of a stator in which the transducer is mounted. Deflection of the support ring due to an imbalanced applied force is compensated by either moving the pads (30) used to mount the support ring, moving the centroid of capacitance (42) of the proof mass, or by modifying the support ring to provide a pair of moment arms (152), each approach insuring that an axis of deflection (102,130) of the support ring is coaligned with the centroid of capacitance, thereby minimizing a bias error in the transducer output.

12 Claims, 5 Drawing Sheets

STRESS COMPENSATED TRANSDUCER

Matter enclosed in heavy brackets [ ] appears in the original patent but forms no part of this reissue specification; matter printed in italics indicates the additions made by reissue.

TECHNICAL FIELD

The present invention generally pertains to a transducer for detecting acceleration, and more particularly, to a transducer wherein a proof mass is mounted in cantilever fashion to a supporting structure that is subject to an imbalanced applied force.

BACKGROUND INFORMATION

In certain transducers of the prior art, one side of a supporting annular ring is clamped in cantilever fashion between two opposed stators. A pair of flexures extend inwardly from the opposite side of the ring to support a [disklike] *disk-like* proof mass. The proof mass includes a torque coil mounted on each face, which upon displacement of the proof mass, operates to restore the mass to a centered position relative to the stators. Surrounding the coil is a plated pick-off capacitance area. Electrical paths on the flexures connect the torque coil and pick-off capacitance area to leads on the support. A representative example of such a transducer is described in greater detail in U.S. Pat. No. 4,250,757, assigned to the same assignee as the present invention.

A problem related to such transducers arises when a force is applied to the supporting ring in a direction perpendicular to the plane of the ring, causing the ring to deflect. The linear and angular deflection of the supporting ring is translated through the flexures to the proof mass, causing a centroid of capacitance, i.e. the effective center of the pick-off capacitance area for small displacements, to be displaced from its normal position wherein it is approximately centered between the top and bottom stators. The torque coil reacts to the displacement of the centroid of capacitance by restoring the proof mass to its prior position. However, because there has been a repositioning of the proof mass resulting in bending of the flexures, a continuous restoring torque is required to balance the moment applied by the flexures. Consequently, the output signal from the transducer includes a bias shift component.

External imbalanced forces applied to the proof mass supporting structure can result from a variety of causes. For example: (a) the gold fly wires that connect to the support may exert a residual force which relaxes over time due to the creep characteristics of gold; (b) an elastic damping material applied to the support may produce an imbalanced force on the structure, due to thermal variations in the environment; (c) static charge buildup can produce either an attractive or repulsive force between the support and an adjacent surface; and, (d) preload variations and thermally variable distortion may result should the cantilevered portion of the support contact an adjacent part of the stator through a contaminating particle or due to assembly error.

A dynamic source of force imbalance applied to the proof mass support may result from loading the support with a "g" force (force of acceleration). In this instance, the bias shift is a linear function of the acceleration, and thus appears as a shift in the transducer scale factor. Such an apparent shift in the scale factor occurring over time can create a significant problem when the transducer is exposed to vibration at a frequency near the resonant frequency of the support. The overall effect of such a dynamically induced loading on the support manifests itself as a vibration rectification error at certain frequency ranges.

Whether resulting from static or dynamically induced imbalanced loading, deflection of the supporting element can cause an undesirable bias shift or error signal in the output of transducers of the prior art type described above. The present invention seeks to compensate for deflection of the support due to such force, whatever its cause, and thereby to minimize bias shift and dynamic signal error in the transducer output that might otherwise result.

SUMMARY OF THE INVENTION

The present invention applies to a transducer of the type described above, wherein a movable proof mass has a plated pick-off capacitance area on its surface. Associated with the [pick=off] *pick-off* capacitance area is a centroid of capacitance. The proof mass is attached by a compliant cantilever arm to a side of the support and is thus movable in a generally transverse direction relative to a plane aligned with a surface of the support. The support is mounted in cantilever fashion within a stator assembly.

The transducer further comprises means for detecting a change in motion of the transducer along the transverse direction by sensing a displacement of the pick-off capacitance area, means for producing a restoring signal to eliminate the displacement, and producing an output signal that is a function of the restoring signal and thus indicative of the change in motion.

An imbalanced force applied against the support, having a component in the transverse direction, is compensated in several alternative ways according to the present invention. The basic premise of the invention in providing such compensation is that the centroid of capacitance must be aligned with a deflection axis about which the support deflects under the applied imbalanced force, so that the centroid of capacitance does not deflect because of that force. One approach to achieving this condition provides for changing the disposition of a plurality of pads disposed between the support and the stator assembly within which support is mounted. Instead of being spread widely apart, as in the prior art design, the pads are grouped closely together in a relatively short segment of the support, opposite the side at which the cantilever arm connects the pick-off capacitance to the support. Closely grouping the mounting pads in this fashion shifts the axis about which the support deflects under the applied imbalanced force so that it is aligned with the centroid of capacitance.

In the instance where the imbalanced force is applied to the support at a point closer to one edge of the cantilever arm than to the other, the compensation comprises provision of a larger capacitance area on a side of the proof mass that is farther from that point than on a side that is nearer, thereby shifting the centroid of capacitance into alignment with the deflection axis.

In a further alternative, the support includes first and second integral slots defining two moment arms extending generally toward a side of the support to which the imbalanced force is applied. Mounting pads are disposed on the ends of the moment arms, between the stator assembly and the support. The moment arms serve to shift the axis about which the support is deflected, so that it is aligned with the centroid of capacitance, and thus compensate for the imbalanced force applied to the support.

The invention further comprises a method for accomplishing the compensation of an imbalanced force applied to the support, as described above.

DISCLOSURE OF THE PREFERRED EMBODIMENTS

Figure 1:
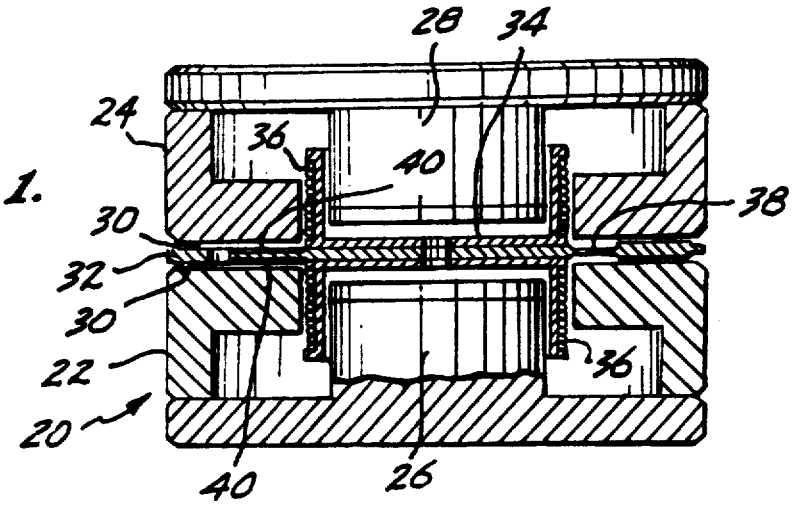
FIG. 1 is a cross-sectional view of a transducer to which the present invention is applied.

With reference to FIG. 1, a transducer 20 is shown, which is useful for producing a signal indicative of acceleration directed along a preferred axis. Transducer 20 includes first and second stators 22 and 24, respectively, which comprise corresponding first and second magnets 26 and 28, disposed in opposed axial alignment. Stators 22 and 24 compressively abut pads 30 disposed on opposite surfaces of a support ring 32. Support ring 32 is thus mounted between stators 22 and 24 along one side of its circumference.

A disk-like proof mass 34 is mounted in cantilever fashion inside the inner circumference of support ring 32 by a cantilever arm comprising flexures 38 which extend from the inner circumference of support ring 32 toward the side at which are disposed mounting pads 30. Proof mass 34 has a generally planar surface from which a cylindrical torque coil 36 extends on each side to partially enclose magnets 26 and 28. Opposite surfaces of proof mass 34 (outside the circumference of torque coil 36) are coated with a metallic layer comprising a pick-off capacitance area 40. Associated with pick-off capacitance area 40 is a centroid of capacitance 42, defined as the capacitive center of the pick-off capacitance area.

Figure 2:
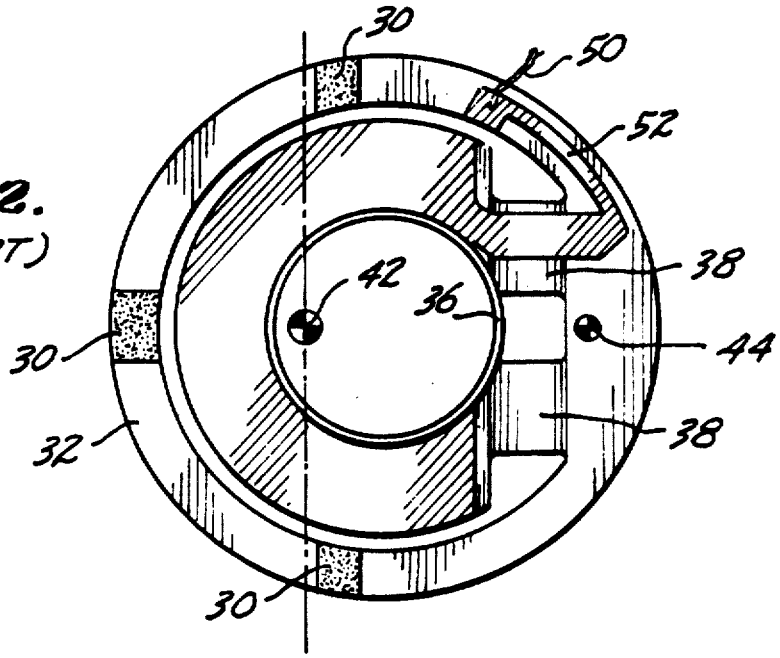
Fig. 2. (PRIOR ART)
FIG. 2 shows in plan view, the proof mass and supporting structure of a prior art transducer.

A prior art support ring and proof mass assembly is shown in FIG. 2, wherein the centroid of capacitance including the stray capacitance of adjacent conducting surfaces is generally aligned with a line extending between the most widely disposed support pads 30. The pick-off capacitance area 40 is electrically connected through a conductive path 52 comprising a metallic layer that extends from pick-off capacitance area 40 across flexures 38 onto support ring 32. A gold fly wire 50 contacts an end of the conductive path 52 and provides a conductive path to the stator assembly.

Figure 3:
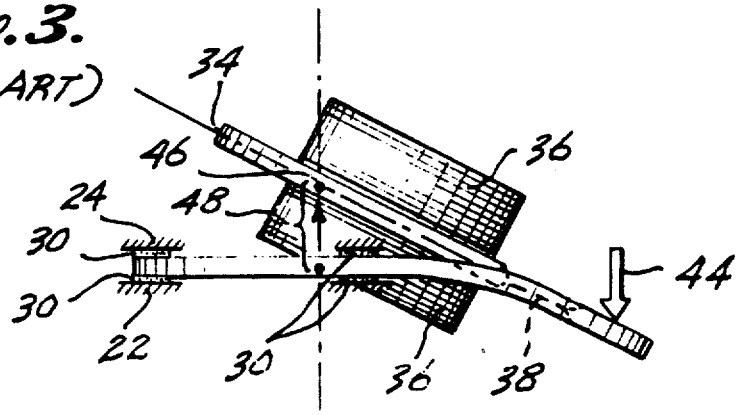
Fig. 3. (PRIOR ART)
FIG. 3 illustrates in an elevational view a displacement of the centroid of capacitance resulting from an applied force causing deflection (exaggerated) of the supporting ring of the prior art transducer shown in FIG. 2.

The prior art support ring 32 is mounted in widely spaced-apart pads 30 (i.e., the end pads 30 being almost aligned with a diameter of the support ring, as shown in FIG. 2), and may be subject to an imbalanced force applied as indicated by arrow 44 in FIG. 3, having a component directed parallel to the preferred axis. The various sources and causes of such a deflecting force were discussed hereinabove, and need not be repeated. As shown in an exaggerated fashion in FIG. 3, force 44 causes support ring 32 to deflect downwardly. The downwardly deflection of support ring 32 results in an upwardly directed vertical displacement 48 of the centroid of capacitance 42. In response to displacement 48 of the centroid of capacitance 42 from its "normal" or original position, i.e., centered between first and second stators 22 and 24, torque coils 36 produce a magnetic restoring force relative to first and second magnets 26 and 28 that causes a bending moment about flexures 38, restoring the centroid of capacitance 42 to its original position. As a result of the restoring action produced by torque coils 36, the output signal from the prior art transducer shown in FIG. 3 includes a bias error, i.e. an offset component.

An imaginary line extended from the point on support ring 32 at which force 44 is applied, through the plane of proof mass 34 (prior to the restoring action of torque coils 36), serves as a reference to define a second line 46 that is perpendicular thereto and is disposed immediately above the normal position of the centroid of capacitance 42. This second line 46 is a line about which support ring 32 deflects due to the applied force 44 and is defined as the "axis of deflection."

Figure 4:
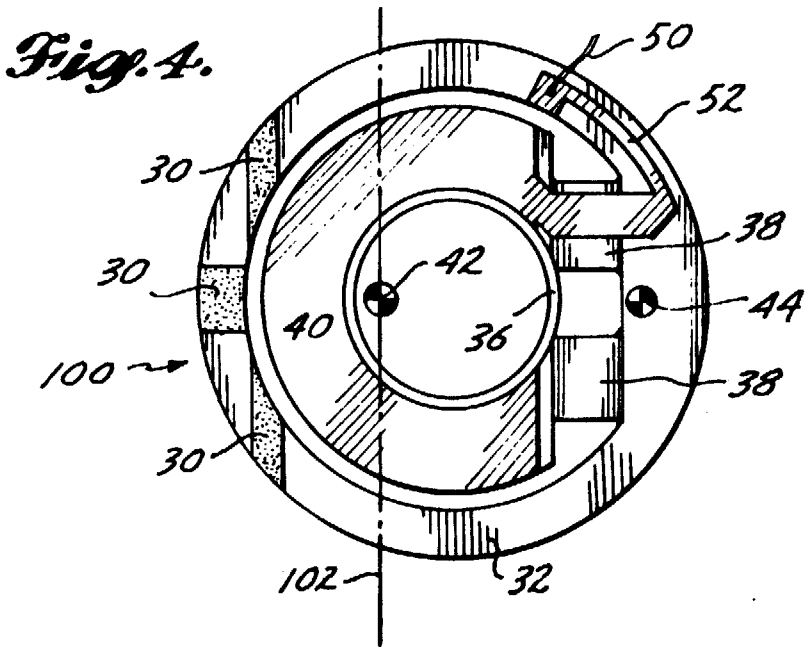
FIG. 4 shows in plan view, a first embodiment of the proof mass and supporting ring structure comprising the present invention.
Figure 5:
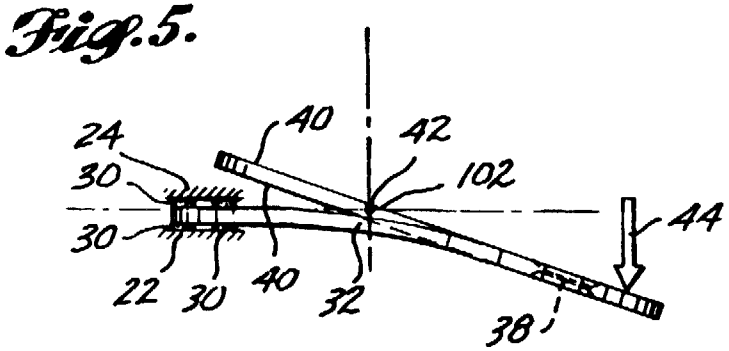
FIG. 5 shows in elevational view, the first embodiment shown in FIG. 4, following application of an imbalanced force to the supporting ring.

Turning now to FIGS. 4 and 5, a first approach is disclosed for compensating for an applied imbalanced force 44. In this first embodiment of the present invention, generally denoted by reference numeral 100, the prior art transducer of FIGS. 2 and 3 is modified by moving the outermost support pads 30 so that they are closely grouped with the center support pads 30; thus, all pads are disposed on a relatively shorter segment of the support ring 32 than in the prior art design. For the sake of clarity, torque coil 36 is not shown on this embodiment nor in the figures showing the other embodiments of the present invention. As shown in FIG. 5, an axis of deflection 102 (defined as was the axis of deflection 46), is aligned with the centroid of capacitance 42. As [is] *a* result, the imbalanced force 44 does not cause the centroid of capacitance 42 to deflect from its normal position and torque coil 36 does not produce a restoring force. Thus, the output of the transducer is free of any bias signal error due to the deflection of support ring 32.

Figure 6:
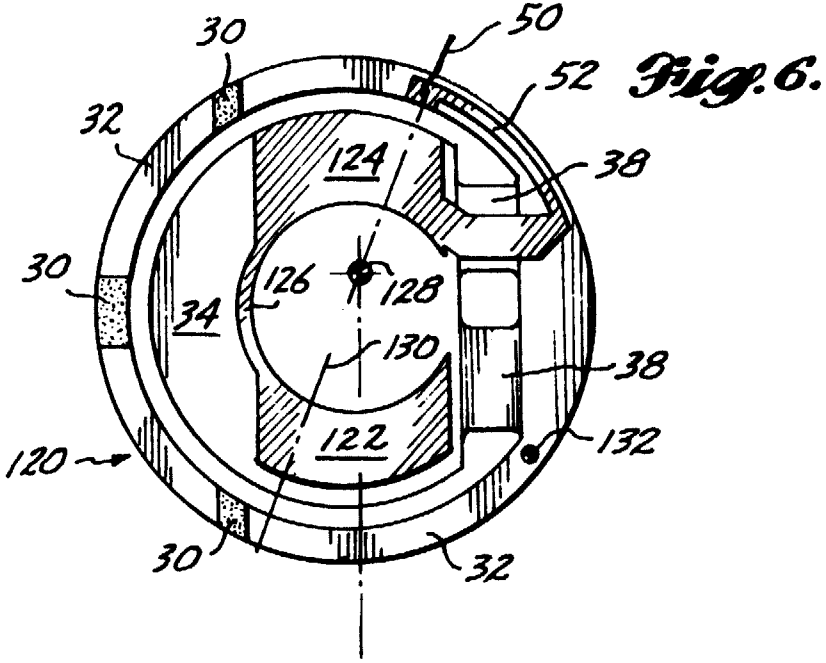
FIG. 6 is a plan view illustrating the proof mass and supporting ring structure for a second embodiment of the present invention, wherein a deflecting force is applied adjacent an edge of a compliant flexure.
Figure 7:
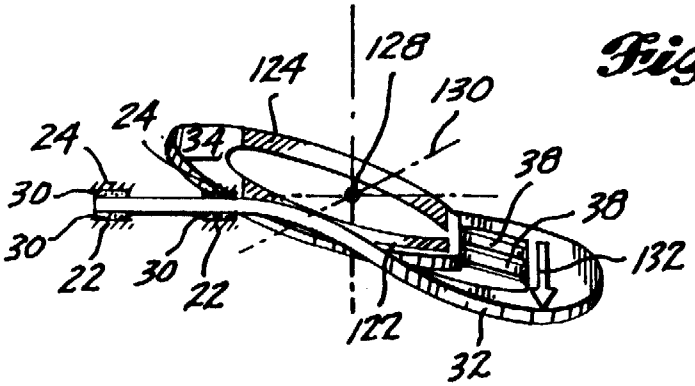
FIG. 7 shows an elevational view of the second embodiment of FIG. 6, illustrating the deflection (exaggerated) in the supporting structure resulting from the applied imbalanced force.

Turning now to FIGS. 6 and 7, a second embodiment of the present invention, generally represented by reference numeral 120, is shown wherein a deflecting force 132 is applied to support ring 32 at a point which is substantially closer to one edge of the cantilever arm than to its other edge, i.e., closer to one of flexures 38 than to the other. Absent any provision for compensating force 132, the prior art transducer shown in FIGS. 2 and 3 would produce a bias error signal as a result of the applied imbalanced force 132. To compensate for the "off centered" deflection of support ring 32 caused by force 132, the second embodiment of the subject invention 120 is provided a centroid of capacitance 128 which is shifted from the previous centroid of capacitance 42. The change in the disposition of the centroid of capacitance 128 results from provision of an asymmetrical distribution of the pick-off capacitance area. A relatively larger plated capacitance area 124 is disposed on a portion of proof mass 34 that is relatively farther away from the point at which force 132 is applied than is a second smaller pick-off capacitance area 122. The relative sizes and arrangement of pick-off capacitance areas 124 and 122 are selected so that the centroid of capacitance 128 is shifted onto an axis of deflection 130 associated with the deflection of support ring 32 caused by the applied force 132. Due to the coincidence of the centroid of capacitance 128 with the axis of deflection 130, the centroid of capacitance 128 is not displaced from its normally centered position between first and second stators 22 and 24 of support ring 32; therefore, an output signal from the transducer to which the second embodiment 120 is applied does not include a bias error. A mechanical effect similar in result can be obtained by making the support ring (on the side [closes t] *closest* to the load) stiffer by increasing its width or thickness or reducing its length, while using pick-off capacitance area 40 instead of areas 124 and 122.

Figure 8:
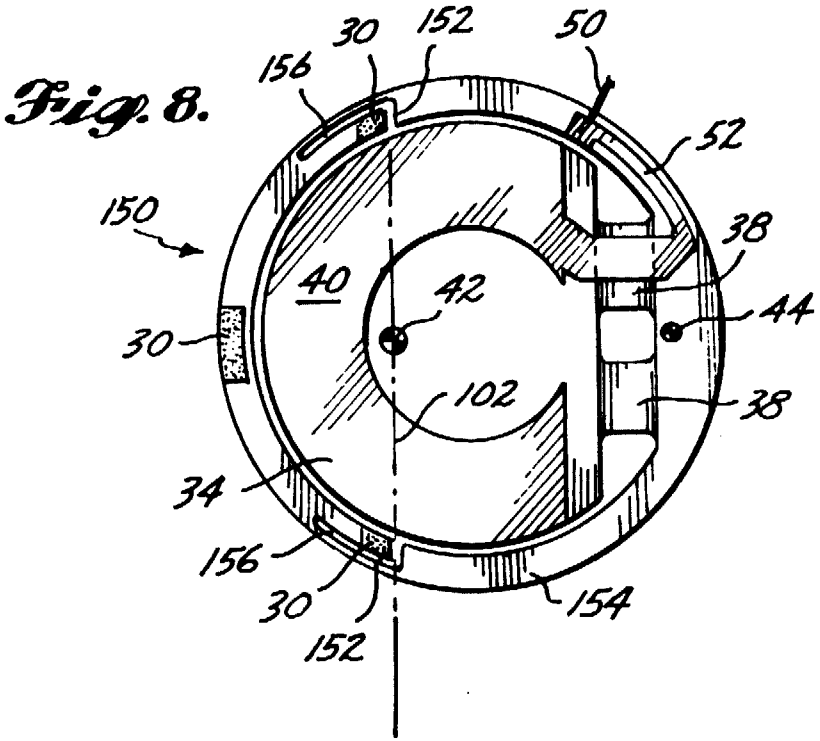
FIG. 8 shows in plan view, a third embodiment of the present invention.
Figure 9:
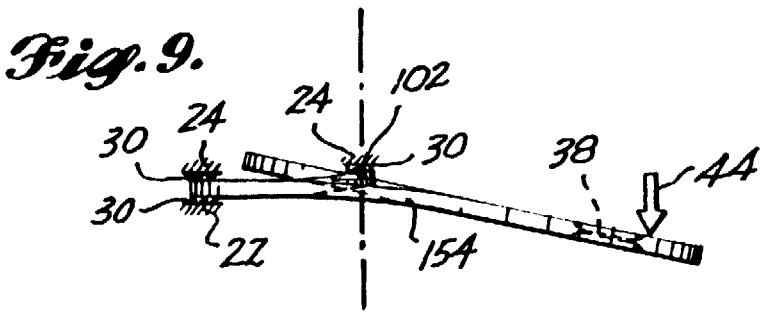
FIG. 9 illustrates in elevational view, the result of an applied force causing deflection (exaggerated) of the supporting structure of the third embodiment shown in FIG. 8.

A third embodiment of the subject invention is generally denoted by reference numeral 150 as shown in FIGS. 8 and 9. In this embodiment, moment arms 152 are provided on a support ring [54] *154*, and are defined by "L" shaped slots 156, which, in a first leg, extend radially outward from the internal circumference of support ring 154, and in a second leg, are aligned parallel with the circumference. Mounting pads 30 are applied to the extending ends of moment arms 152, generally lying on a line extending through the centroid of capacitance 42. Centered between moment arms 152 and disposed opposite flexures 38 are other mounting pads 30, as in the first embodiment. As shown in FIG. 9, provision of moment arms 152 shifts the axis of deflection 102 so that it is aligned with the centroid of capacitance 42. Again, a force 44 applied to support ring 154 causes it to deflect about axis 102, but dies not cause any displacement of the centroid of capacitance 42 from its normal position. As a result, the output from a transducer incorporating the third embodiment 150 does not include a bias error due to the applied imbalanced force 44.

Figure 12:
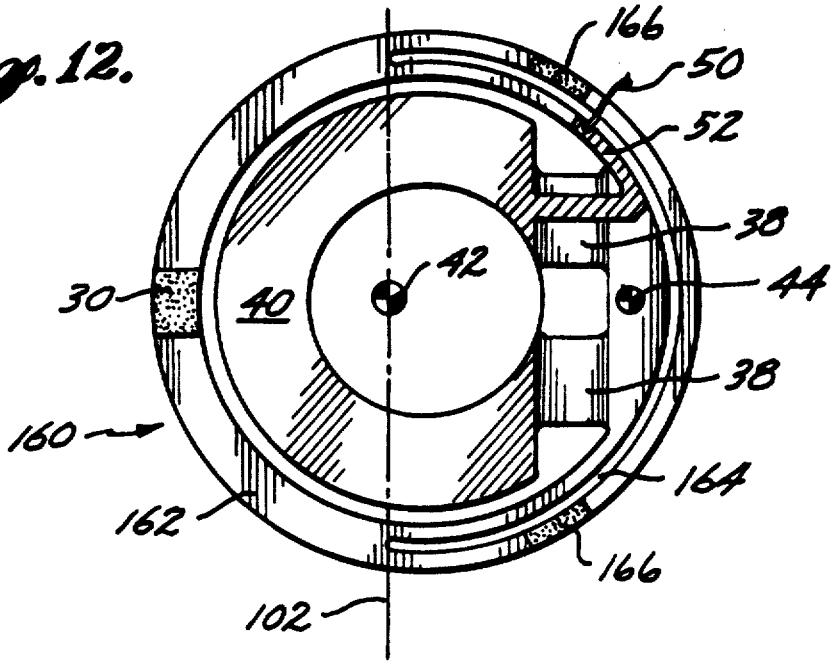
FIG. 12 shows a fourth embodiment of the present invention, related to the third embodiment, in a plan view.
Figure 13:
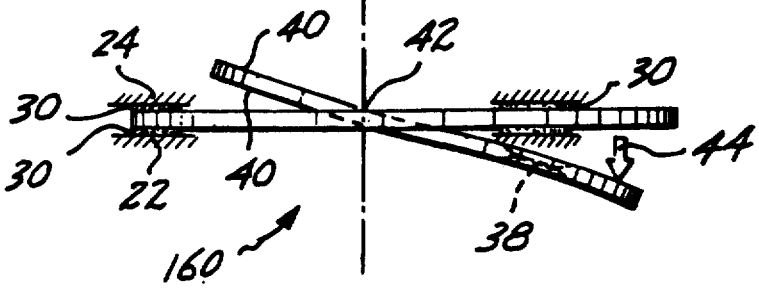
FIG. 13 shows the fourth embodiment in elevational view.

Turning to FIGS. 12 and 13, a fourth embodiment of the present invention is generally denoted by reference numeral 160. A support ring 162 includes an arcuate slot 164 disposed adjacent flexures 38, centered in the radial extent of the ring, and terminating at each end approximately at axis 102. A pair of mounting pads 30 are disposed opposite flexures 38, on each side of ring 162. Additional pairs of narrow mounting pads 166 are provided on each side of support ring 162, spaced apart from mounting pads 30 approximately [on] *one* third of the circumference of the support ring. A force 44 applied to support ring 162 adjacent flexures 38 (i.e., on the portion radially inside slot 164) causes the support ring to deflect downwardly about axis [1023] *102*, but the centroid of capacitance does not deflect from its normal position. Slot 164 thus shifts the bending axis 102 into alignment with the centroid of capacitance 42.

Figure 14:
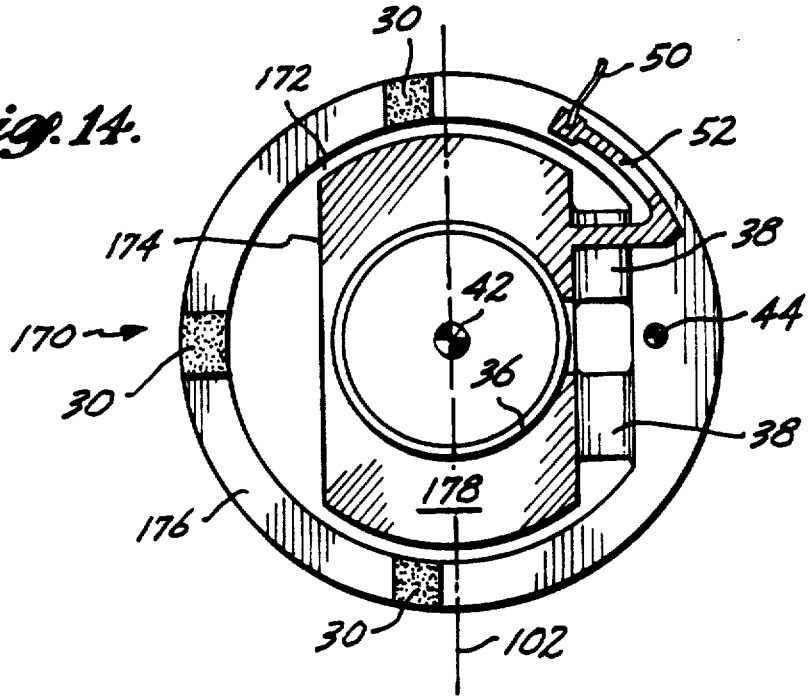
FIG. 14 shows a fifth embodiment of the present invention in plan view.
Figure 15:
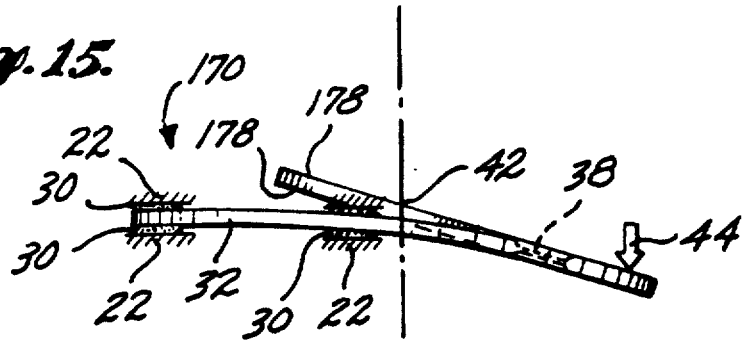
FIG. 15 shows the fifth embodiment in elevational view.

Finally, a fifth embodiment is shown in FIGS. 14 and 15 and is identified by reference numeral 170. As clearly shown in FIG. 14, a proof mass 172 is trimmed to provide a flat side 174 opposite flexures 38. A support ring 176 is mounted with support pads 30, in a generally conventional manner. Pick-off capacitance area 178 is applied to the proof mass in a generally symmetrical pattern relative to the center of the torque coil 36, making the centroid of capacitance 42 coincident with the center of the torque coil, and with axis 102. A force 44 applied to deflect support ring 176 about axis 102 merely causes the torque coil to pivot about that axis, but does not deflect the centroid of capacitance.

Although it may appear that compensation for an applied imbalanced force 44 or 132, by appropriately shifting either the axis of deflection or the centroid of capacitance into alignment depends upon the magnitude of the applied force, it can be shown that this is not the case. Proof of the preceding premise is presented herein for a simplistic rectangular shaped support and proof mass assembly, as shown in FIGS. 10 and 11; however, the result applies equally well to a circular or more complex shaped support and proof mass assembly.

Figure 10:
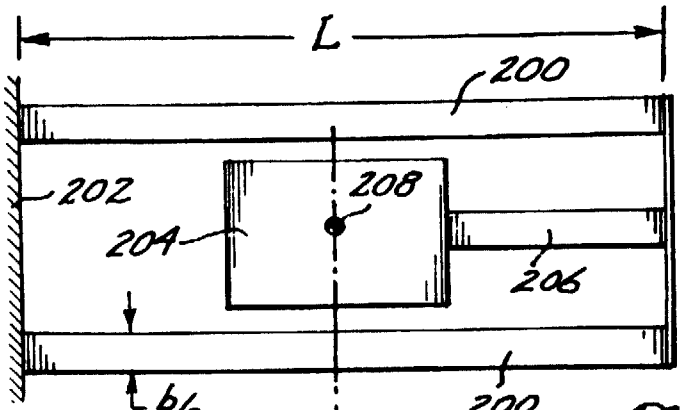
FIG. 10 is a geometric representation of a cantilevered support arm and cantilevered proof mass.
Figure 11:
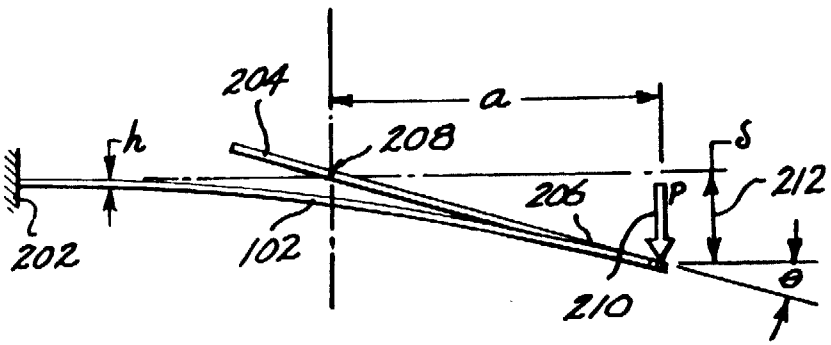
FIG. 11 is an elevational view of the representation shown in FIG. 10, following application of a deflecting force.

Referring now to FIGS. 10 and 11, two parallel supports 200, each of thickness "h" and width b/2 extend over a length L. Supports 200 are cantilevered from a supporting structure 202 at one end, and at their other end, are connected along a line from which a proof mass [205] *204* is cantilevered by means of a flexure 206. A central point 208 (corresponding to a centroid of capacitance) is selected within the interior of proof mass 204 at a distance "a" from the outwardly extending ends of support arms 200, and a force "P" is applied, as shown by arrow 210, to deflect support arms 200 by a distance "δ" as shown at 212. The angle of deflection or slope is equal to "θ".

The standard equation for deflection of a rectangular beam having a modulus of elasticity, "E" is given as:

$$\delta = 4PL^3/Ebh^3 = K_\delta P.$$

The slope at the free end of arms 200 is:

$$\theta = 6PL^2/Ebh^3 = K_\theta P.$$

However, since $a = \delta/\tan\theta$, for small angles where $\tan\theta = \theta$ (radians), $a = \delta/\theta$. Substituting from the previous equations, $$[a = K_\delta P/K_\theta P = K_\delta/K_{74}]$$

$$a = K_\delta P/K_\theta P = K_\delta/K_\theta$$

Therefore, the position of point 208 described by the length "a" is the ratio of two constants which depend on invariant characteristics of a given support and proof mass assembly and which, for small angles, are not a function of the magnitude of the displacement. The position where the central point 208 crosses the no load position line is independent of the magnitude of the load P that is applied. Thus, it is always possible to align a centroid of capacitance with an axis of deflection regardless of the magnitude of the imbalanced force applied to the support ring (so long as the deflection of the support ring subscribes a small angle).

It will be apparent to one skilled in the art that the above proof holds true for beams of different cross-section and taper. Taking that a step further, it will be apparent that for small displacements of any linearly elastic structure, the displacement and the local slope are linear functions of load. Therefore, with an appropriate free proof mass structure, a point of zero relative translation can be found, because the distance to this point (similar to "a" in the equation above) is independent of the applied load. It will further be apparent that compensation for an applied force on the support ring 32 or 154 can be achieved by either moving the pads 30 as in the first embodiment 100, moving the centroid of capacitance 128 as in the second and fifth embodiment 120 and 170, or by modifying the support ring 154 as in the third and fourth embodiment 150 and 160, respectively.

Although the present invention has been disclosed with respect to several preferred embodiments modifications thereto will be apparent to those skilled in the art. Accordingly, it is not intended that the invention be limited by the disclosure or by such modifications, but instead that its scope should be determined entirely by reference to the claims which follow hereinbelow.

The embodiments of the invention in which an exclusive property or privilege is claimed are defined as follows:

1. A transducer comprising:

(a) a movable proof mass to which is applied a pick-off capacitance plate having a centroid of capacitance;

(b) a support within which the proof mass is mounted, said support including a fixed portion and a cantilevered portion, said proof mass being attached by a compliant cantilever arm to the cantilevered portion of the support and thus movable in a generally transverse direction relative to a plane aligned with a surface of the support;

(c) a stator assembly in which the fixed portion of the support is mounted, the cantilevered portion of the support deflecting around a deflection axis with respect to the stator assembly in response to an imbalanced force acting on the cantilevered portion of the support, where said imbalanced force has a component in the transverse direction;

(d) means for detecting a change in the motion of the transducer along the transverse direction by sensing a displacement of the pick-off capacitance plate, including means for producing a restoring signal to eliminate the displacement and operative to produce an output signal that is a function of the restoring signal and thus indicative of the change in the motion; and (e) means for mechanically compensating for a deflection of the support caused by the imbalanced force, said means comprising slot means for dividing the support into the fixed portion and the cantilevered portion and operative to align the centroid of capacitance with the deflection axis about which the support deflects under the applied imbalanced force, whereby the centroid of capacitance is not displaced due to deflection of the cantilevered portion by the imbalanced force and bias shift in the output signal that would otherwise be caused by displacement of the pick-off capacitance plate is substantially prevented.

2. The transducer of claim 1, wherein the slot means comprise first and second integral slots defining two moment arms extending generally toward a side of the support to which the imbalanced force is applied, the ends of the moment arms including pads mounting the support and being aligned with a line through the centroid of capacitance.

3. The transducer of Claim 2, further comprising pads mounting the support disposed generally opposite the point at which the imbalanced force is applied and on a side of the support intermediate the moment arms.

4. The transducer of claim 2, wherein the first and second slots are generally "L" shaped.

5. The transducer of claim 1, wherein the slot means comprise an integral arcuate slot and wherein the fixed portion of the support is mounted to the stator assembly.

6. The transducer of claim 5, wherein the arcuate slot extends along the support between a first point and a second point, the first and second points being disposed generally on opposite sides of the support with respect to the cantilever arm.

7. A method for minimizing a bias error in an output signal of a transducer, where the transducer has a pick-off capacitance plate mounted on a cantilever arm extending from a support that is itself mounted as a cantilever from a plurality of spaced apart pads, said method comprising the steps of:

providing at least one slot that is integral to the support and which divides the support into a fixed portion mounted to the pads and a cantilevered portion attached to the cantilever arm, wherein said cantilevered portion deflects about a deflection axis when an imbalanced force is applied to the cantilevered portion of the support; and positioning said at least one slot so that the deflection axis is aligned with a centroid of capacitance of the pick-off capacitance plate, whereby the imbalanced force is prevented from displacing the centroid of capacitance, thereby minimizing the bias error that would otherwise be caused by such displacement.

8. The method of claim 7, wherein the step of providing at least one slot comprises the steps of providing a pair of moment arms extending generally toward the portion of the support from which the cantilever arm extends and mounting the support on an extending end of each moment arm.

9. The method of claim 8, wherein the moment arms are defined by a pair of generally "L" shaped slots disposed in the support.

10. The method of claim 7, wherein said at least one slot extends along the support between a first point and a second point, the first and second points being disposed generally on opposite sides of the support with respect to the cantilever arm, and wherein the step of positioning comprises the step of extending the slot around the support sufficiently so that the deflection axis is aligned with the centroid of capacitance.

11. The method of claim 7, wherein the pick-off capacitance plate includes a restoring coil and wherein the step of positioning one of the centroid of capacitance and the axis about which the support deflects comprises the step of co-locating the centroid of capacitance with the center of the restoring coil.

*12. A transducer comprising:*

*(a) a movable proof mass to which is applied a pick-off capacitance plate;*

*(b) a support within which the proof mass is mounted, said support including a fixed portion and a cantilevered portion, said proof mass being attached by a compliant cantilever arm to a side of the support and thus movable in a generally transverse direction relative to a plane aligned with a surface of the support;*

*(c) a stator assembly in which the fixed portion of the support is mounted, the cantilevered portion of the support deflecting around a deflection axis with respect to the stator assembly in response to an imbalanced force acting on the cantilevered portion of the support, where said imbalanced force has a component in the transverse direction, said deflection axis being disposed adjacent the cantilevered portion of the support;*

*(d) means for detecting a change in the motion of the transducer along the transverse direction by sensing a displacement of the pick-off capacitance plate, including means for producing a restoring signal to eliminate the displacement and operative to produce an output signal that is a function of the restoring signal and thus indicative of the change in the motion; and*

*(e) means for determining the position of the deflection axis about which the cantilevered portion of the support deflects under the applied unbalanced force, said deflection axis position determining means including an arcuate slot having first and second ends formed in the support for dividing the support into the fixed and cantilevered portions, whereby the deflection axis intersects said first and second ends.*

* * * * *